United States Patent
Kirshenbaum

(10) Patent No.: US 6,602,298 B1
(45) Date of Patent: Aug. 5, 2003

(54) METHODS OF STORING AND RETRIEVING COMMUNICATIONS, INFORMATION, AND DOCUMENTS

(75) Inventor: Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/326,090

(22) Filed: Jun. 4, 1999

(51) Int. Cl.⁷ .............................. G06F 15/00; G06K 9/54
(52) U.S. Cl. .................... 715/501.1; 715/526; 715/511; 382/306
(58) Field of Search ................... 717/170; 382/306; 283/74, 17; 707/500, 511, 526; 715/511, 526, 501.1

(56) References Cited

U.S. PATENT DOCUMENTS

| | | | |
|---|---|---|---|
| 4,243,694 A | | 1/1981 | Mansukhani ................. 427/466 |
| 5,093,147 A | | 3/1992 | Andrus et al. ................. 427/7 |
| 5,160,171 A | * | 11/1992 | Gregory et al. ............... 283/91 |
| 5,339,412 A | * | 8/1994 | Fueki .......................... 382/306 |
| 5,398,283 A | * | 3/1995 | Virga ........................... 283/73 |
| 5,504,818 A | * | 4/1996 | Okano ......................... 707/530 |
| 5,673,320 A | * | 9/1997 | Ray et al. ..................... 283/17 |
| 5,697,376 A | * | 12/1997 | Nomura et al. ............. 600/300 |
| 5,735,547 A | | 4/1998 | Morelle et al. ............... 283/67 |
| 5,853,197 A | | 12/1998 | Mowry, Jr. et al. ........... 283/93 |
| 5,869,819 A | * | 2/1999 | Knowles et al. ............. 235/375 |
| 6,130,947 A | * | 10/2000 | Mizobe et al. ................. 283/17 |
| 6,138,151 A | * | 10/2000 | Reber et al. ................. 709/217 |
| 6,178,243 B1 | * | 1/2001 | Pomerantz et al. ......... 358/296 |
| 6,192,165 B1 | * | 2/2001 | Irons ........................... 382/306 |
| 6,381,611 B1 | * | 4/2002 | Roberge et al. ............. 345/854 |
| 6,394,354 B1 | * | 5/2002 | Wilz et al. ................... 235/375 |
| 6,405,223 B1 | * | 6/2002 | Kelley et al. ................ 707/203 |

* cited by examiner

Primary Examiner—Joseph H. Feild
Assistant Examiner—Rachna Singh

(57) ABSTRACT

In one aspect, the invention encompasses a method of storing and retrieving a communication. A communication is stored in a database, and comprises a plurality of sub-components. The communication is stored utilizing software configured to save a plurality of machine-readable identifier codes associated with the communication in the database. The identifier codes identify different sub-components of the communication. Some of the sub-components of the communication are printed together with at least some of the identifier codes as a document. The document does not include all of the sub-components of the communication. The identifier codes are read from the document with a machine configured to extract the identifier codes from the machine-readable format. The identifier codes extracted by the machine are provided to a processor in data communication with the database. The processor is configured to identify all sub-components of the communication. The processor retrieves at least one sub-component from the database that was not printed on the document, and sends the at least one sub-component to an output device.

6 Claims, 3 Drawing Sheets

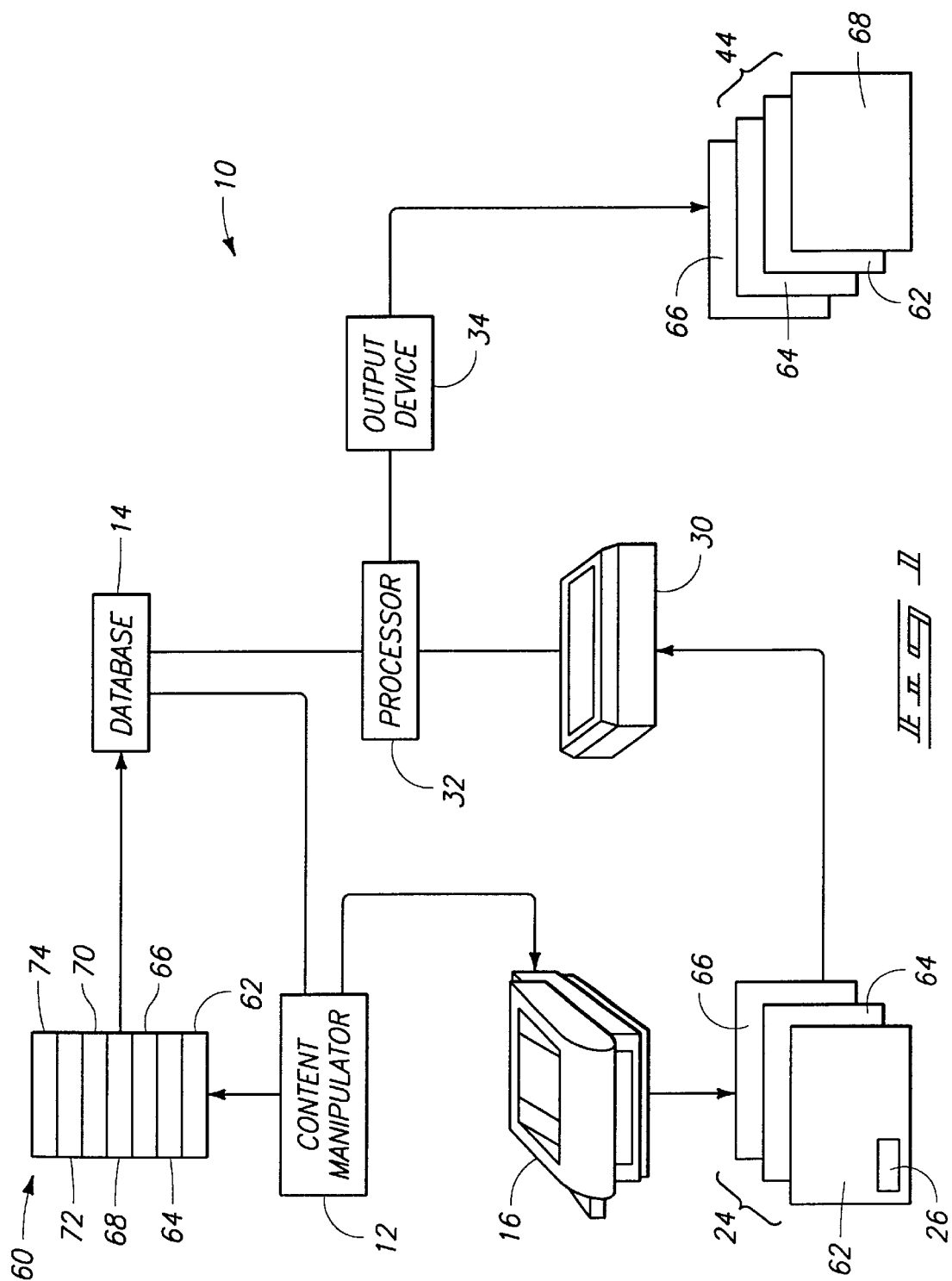

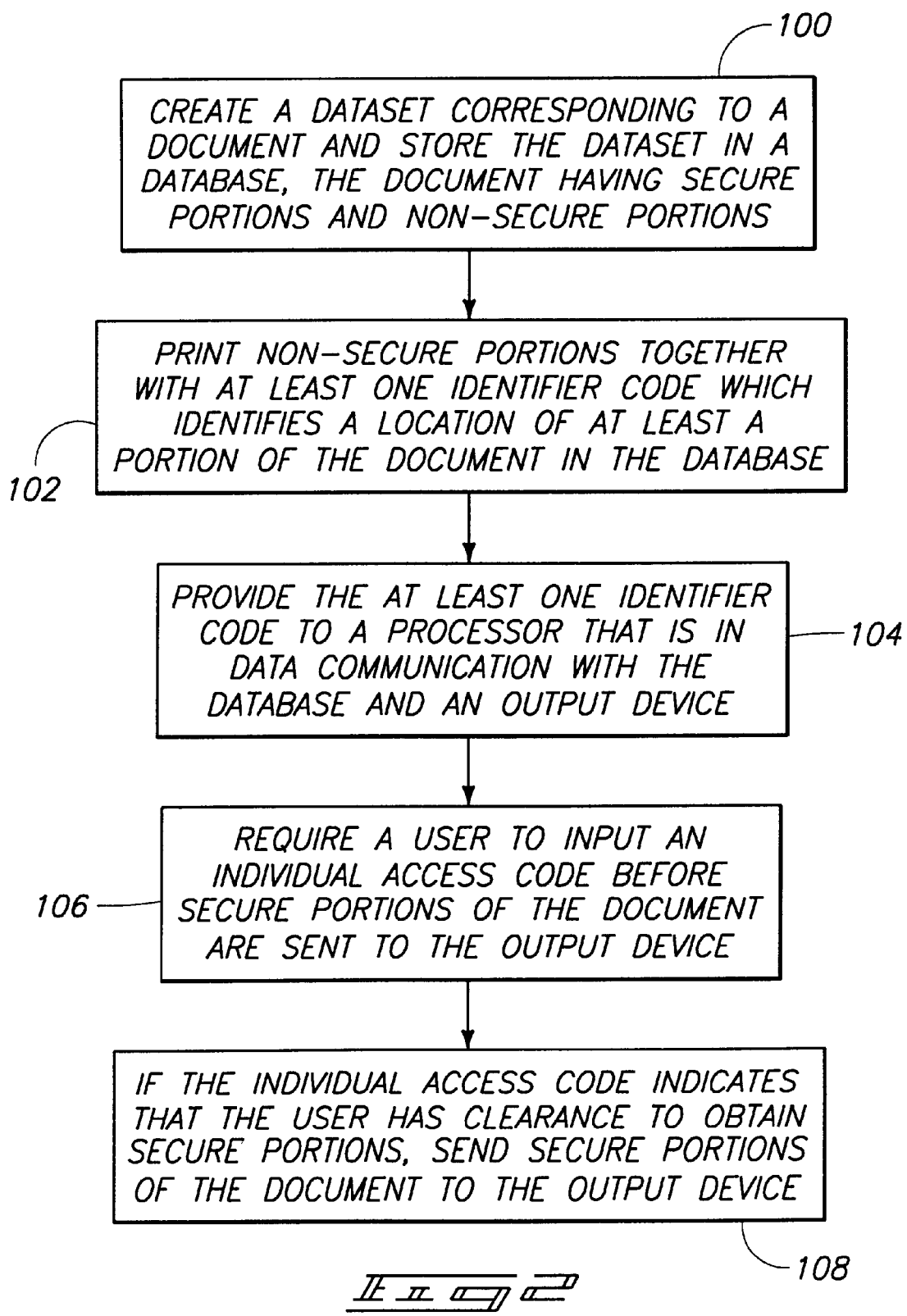

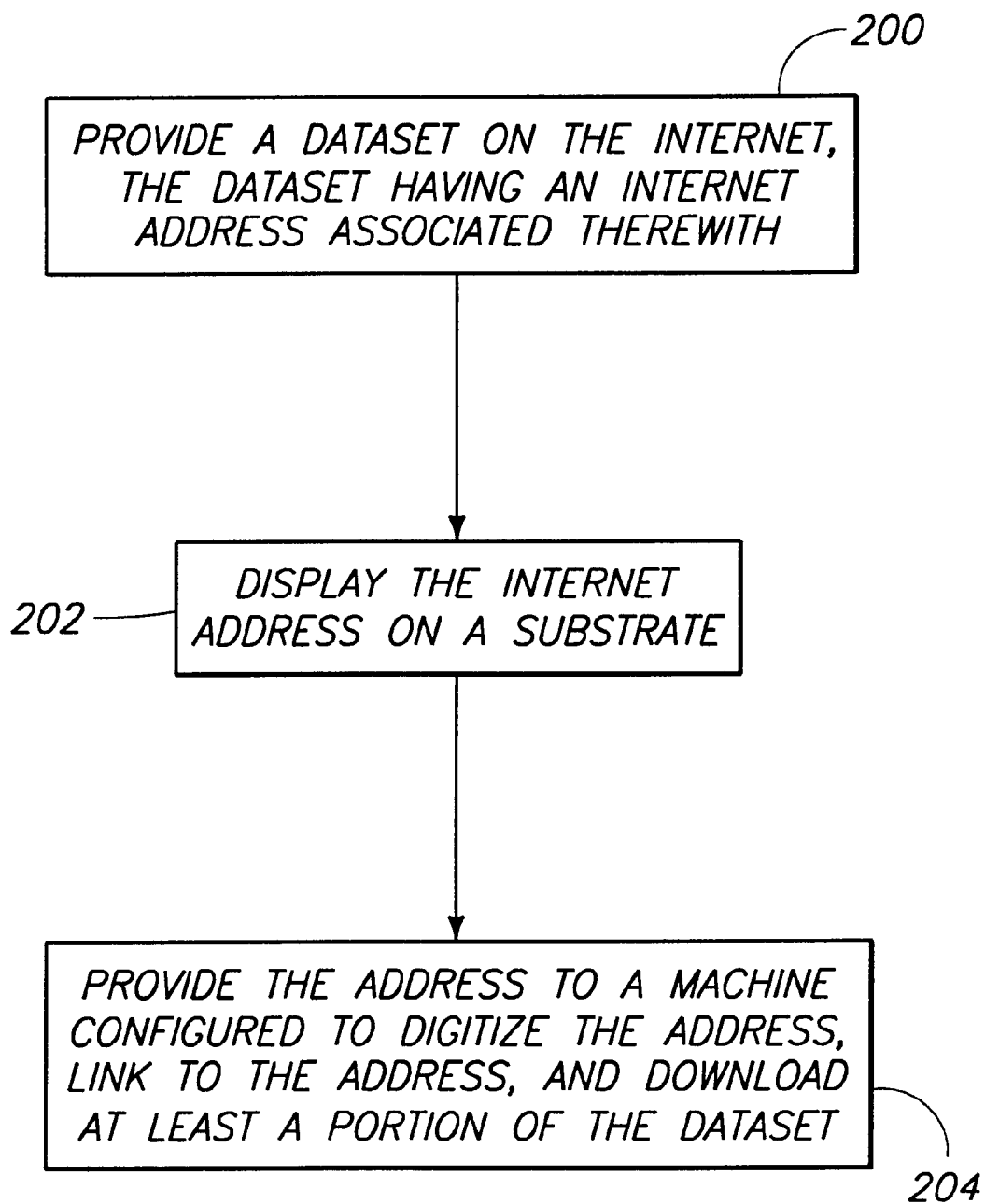

METHODS OF STORING AND RETRIEVING COMMUNICATIONS, INFORMATION, AND DOCUMENTS

FIELD OF THE INVENTION

The invention pertains to methods of storing and retrieving ommunications. In a particular aspect, the invention pertains to methods of retrieving information from the Internet. In another particular aspect, the invention pertains to methods of storing and retrieving documents having different levels of document security provided for different portions of the documents.

BACKGROUND OF THE INVENTION

A continuing challenge to modern society is to improve methods and apparatuses for communication transfer. For purposes of interpreting this document and the claims that follow, the term "communication" is defined to encompass information which is passed from one human to another. Such information can be in the form of textual and/or graphic representations.

Several mechanisms are presently available for passing textual and/or graphical information from one human to another. Such mechanisms include large-scale distribution mechanisms, such as, for example, publication of books, newspapers and periodicals. Communications can also be formed and transferred by office equipment, such as with fax machines and copiers. Fax machines and copiers reproduce a hard copy of a communication, and, in the case of the fax machine, transmit an electronic version of the hard copy to a distant location prior to reproduction of the hard copy. Other mechanisms for distributing communications include electronic mail (E-mail) and network communications. A network which is achieving increasing popularity is the global Internet, which is a network extending across countries in both hemispheres of the globe. The World Wide Web (the Web) is a portion of the global Internet having hypertext-enabled pieces of information. The information on the web is communicated in many formats, including multimedia formats (such as video and audio information), as well as textual and graphical formats. Information on the web is provided with an address, such as, for example, a uniform resource locator (URL), which can be utilized to locate the information on the web.

A difficulty with the above-described mechanisms for passing communications between persons is that such mechanisms generally pass an entirety of a communication from one person to another. It can be desirable to pass only a portion of a communication from one person to another in particular instances. For instance, a communication can comprise some portions which are relatively secure (i.e., portions which are to have only limited distribution), and portions which are relatively less secure (i.e., portions which have a wider distribution than the "secure" portions). In such circumstances, it would be desirable to develop methodologies which could selectively pass only the less secure portions of a document.

Another difficulty with presently established methods for passing communications pertains to the present systems for accessing information on the Internet. It is becoming increasingly prevalent for persons to advertise Internet locations with so-called "out-of-band" transmissions. The "out-of-band" transmissions are defined as transmissions which are not electronically linked with the Internet. For instance, a URL address printed on a substrate, such as, for example, a magazine or newspaper, is an "out-of-band" transmission. Also, a URL address broadcast by radio or television is also an out-of-band transmission. Present methods for accessing the Internet require a user to observe an out-of-band transmission, and subsequently input the out-of-band transmission to a processor by manually inputting the URL address, typically, one letter at a time. It would be desirable to develop new and more automated methods of inputting URL addresses from out-of-band transmissions to retrieve information from the Internet.

SUMMARY OF THE INVENTION

In one aspect, the invention encompasses a method of storing and retrieving a communication. A communication is stored in a database, and comprises a plurality of sub-components. The communication is stored utilizing software configured to save a plurality of machine-readable identifier codes associated with the communication in the database. The identifier codes identify different sub-components of the communication. Some of the sub-components of the communication are printed together with at least some of the identifier codes as a document. The document does not include all of the sub-components of the communication. The identifier codes are read from the document with a machine configured to extract the identifier codes from the machine-readable format. The identifier codes extracted by the machine are provided to a processor in data communication with the database. The processor is configured to identify all sub-components of the communication. The processor retrieves at least one sub-component from the database that was not printed on the document, and sends the at least one sub-component to an output device.

In another aspect, the invention encompasses a method of retrieving information from the Internet. A data set is provided, and the data set has an address on the Internet. The address is displayed on a substrate. The substrate is provided to a machine configured to digitize the address, link to the address on the Internet, and download at least a portion of the data set from the Internet.

In yet another aspect, the invention encompasses a method of storing and retrieving a document. In such aspect, different levels of document security are provided for different portions of the document. A data set is created which corresponds to the document. The data set is stored in a database together with a plurality of machine-readable identifier codes associated with the data set. The identifier codes identify the different portions of the document. The database is accessible to a plurality of users. Some portions of the document are defined as secure portions and other portions are defined as non-secure portions. Some users have authorization to access non-secure portions of the document, but do not have authorization to access secure portions of the document. The users are assigned access codes which identify if the users have clearance to access secure portions of the document. The non-secure portions of the document are printed on a substrate, together with at least some of the identifier codes. The identifier codes are provided to a processor in data communication with the database. The processor is configured to retrieve both the secure and the non-secure portions of the document and to send the retrieved portions of the document to an output device. The processor is further configured to recognize if an access code provides clearance to secure portions of the document. A user is required to input its individual access code to the processor before secure portions of the document are sent to the output device. The processor sends secure portions of the document to the output device only if an inputted individual user code indicates that the user has clearance to obtain the secure portions.

DESCRIPTION OF THE DRAWINGS

FIG. 1 is a diagrammatic view of a system encompassed by the present invention.

FIG. 2 is a flow chart describing a process encompassed by the present invention.

FIG. 3 is a flow chart describing another process encompassed by the present invention.

DETAILED DESCRIPTION OF THE INVENTION

In one aspect, the invention encompasses methods of storing and retrieving communications. Such aspect of the invention is described with reference to FIG. 1, which shows a system 10 encompassed by the present invention. System 10 comprises a content manipulator 12 which is configured to generate a communication. Content manipulator 12 can comprise, for example, a software package (such as, for example, Microsoft Word™, Corel Word Perfect™, or Microsoft Excel™). Content manipulator 12 is utilized to create a communication 60 having a plurality of sub-components (62, 64, 66, 68, 70, 72 and 74). The particular software utilized for content manipulator 12 will vary depending on the type of communication 60. The communication type an comprise, for example, a graphics display, a textual display, a spread sheet display, a video display, an audio file, or a combination of one or more of the above-described displays and files.

In the embodiment of FIG. 1, content manipulator 12 is in data communication with a database 14 and is configured to store communication 60 within database 14. In interpreting this document and the claims that follow, it is to be understood that when a communication is "stored" on a database, the term "store" includes storing data corresponding to a communication on a database, and storing software configured to generate the communication on a database. Content manipulator 12 is preferably configured to save a plurality of machine-readable identifier codes associated with communication 60 in database 14, and which identify different sub-components (62, 64, 66, 68, 70, 72 and 74) of communication 60. Database 14 can comprise, for example, a network, such as, for example, the Internet. Database 14 is configured for electronic storage of the sub-components of communication 60 and the machine-readable identifier codes associated with communication 60.

An image forming device 16 is in data communication with content manipulator 12. In the shown embodiment, image forming device 16 is a printer. Printer 16 is utilized to print sub-components 62, 64 and 66 of communication 60. The sub-components are printed on a substrate to form a document 24. Additionally, at least some of the identifier codes are printed as machine-readable code 26 on document 24. The identifier codes identify the particular sub-components which are printed, and further identify an entirety of the sub-components associated with communication 60 in database 14.

In the shown embodiment, sub-components 62, 64 and 66 are illustrated as separate sheets of document 24. It is to be understood, however, that sub-components 62, 64 and 66 can be formed on a common sheet of document 24. Also, although in the shown embodiment the machine-readable code is shown printed on only one of the sheets of document 24, it is to be understood that the invention encompasses other embodiments wherein the machine-readable code is printed on a plurality of the sheets of document 24.

Machine-readable code 26 can comprise, for example, a bar code, or a camouflaged code. Exemplary camouflaged codes can be formed by utilization of ink which is invisible when viewed with only light having visible wavelengths, or half tone printing processes which hide the machine-readable code within a textual or graphical image displayed on document 24.

Document 24 is passed to a machine 30 configured to read machine-readable code 26. Machine 30 can comprise, for example, a scanning machine. Machine 30 is in data communication with a processor 32, which is in turn in data communication with database 14. Identifier codes are extracted from the machine-readable code 26 by machine 30 and provided to processor 32. Processor 32 is configured to identify all sub-components of communication 60 that are stored on database 14, and to retrieve at least one sub-component from database 14 that was not printed as part of document 24. Although processor 32 is described as being in data communication with database 14, it is to be understood that processor 32 could instead, or additionally, be in data communication with another database containing communication 60. Processor 32 can be separate from machine 30 (as shown), or comprised by machine 30.

An output device 34 is in data communication with processor 32. Output device 34 can comprise, for example, a display terminal or a printer. Although output device 34 is shown as a distinct device separate from printer 16, it is to be understood that the invention encompasses embodiments wherein output device 34 is the same device as printer 16 or machine 30.

The sub-components retrieved from database 14 by processor 32 are sent to output device 34 and subsequently displayed as a second document 44. In the shown embodiment, second document 44 comprises the sub-components 62, 64 and 66 of the first document 24, and further comprises an additional sub-component 68 of communication 60. Although in the shown embodiment, second document 44 comprises all of the sub-components contained in first document 24, it is to be understood that the invention encompasses other embodiments wherein second document 44 does not comprise all of the sub-components contained in the first document 24.

A particular method of application of the system 10 of FIG. 1 is to print a full version of a document when a document summary is provided to machine 30.

Another particular method of application of the system 10 of FIG. 1 is to protect secure portions of a document while enabling distribution of non-secure portions of the document (the non-secure portions can be separate portions from the secure portions, or can be non-secure variants of the secure portions). For purposes of interpreting this document and the claims that follow, the terms "secure" and "non-secure" are defined as terms relative to one another, rather than as absolute terms. Specifically, a secure sub-portion of a document is defined as a sub-portion which is to have a more limited distribution among a group of persons than a non-secure sub-portion of the document. However, it is to be understood that the portion of the document referred to as a "non-secure" portion of the document can still have security measures associated therewith. Also, it is to be understood that there can be portions of the document which have even more security measures associated therewith than that portion referred to as a "secure" portion.

The aspect of the invention pertaining to regulating distribution of secure portions of a document relative to non-secure portions of a document is described with reference to a flow chart diagram of FIG. 2. In an initial step of FIG. 2 (labeled as 100) a data set is created which corresponds to a document. The data set can be created utilizing, for example, the content manipulator 12 described above with reference to FIG. 1. The data set is stored in a database (which can comprise, for example, the database 14 of FIG. 1). The document comprises secure portions and non-secure portions. Such secure portions and non-secure portions can correspond to sub-components 62, 64, 66, 68, 70, 72 and 74 of a document 60 described above with reference to FIG. 1.

At step 102, non-secure portions of the document are printed together with at least one identifier code which identifies a location of at least a portion the document in the database.

At step 104 the identifier code of step 102 is provided to a processor (which can comprise, for example, the processor 32 of FIG. 1) that is in data communication with the database and an output device. The identifier code can be provided to the processor through utilization of a scanning machine, such as, for example, the scanning machine 30 described above with reference to FIG. 1.

At step 106, a user inputs an individual access code to the processor. The processor can be configured to accept the access code in a variety of formats. For instance, the processor can be configured to accept access codes provided through keyboard or voice input. Alternatively, the processor can be configured to sense physical aspects of a user (such as, for example, voice frequencies, fingerprints, etc.) and to correlate such physical information with an identification of the user. The processor is in data communication with a database which correlates user identities with the authorization of the various users for secure and non-secure portions of the document.

The processor is configured to retrieve both secure and non-secure portions of the document, and to send the retrieved portions of the document to the output device. The processor is further configured to recognize if an access code provides clearance to the secure portions of the document. Additionally, the processor is preferably configured to send secure portions of the document to the output device only if an inputted individual access code indicates that a user has clearance to obtain the secure portions. If the access code does not indicate clearance to obtain the secure portions, the processor is preferably configured to either provide nothing to the output device, or to provide only the non-secure portions of the document to the output device. In particular embodiments, a user may be required to input its individual access code before any portions of a document are sent to the output device. In other embodiments, the user may be required to input its individual access code only before secure portions of the document are sent to the output device. In particular embodiments, the processor is configured to identify a security clearance level of a user and then to enable the user to print portions of a document at any security level below the user's level. Thus, a user cleared to view highly secure portions of a document could elect to print a version of the document that lacked such highly secure portions, and that was, accordingly, suitable for distribution to persons having less security clearance than the user.

It is noted that in a preferred embodiment of the invention, the identifier codes printed on non-secure portions of a document are machine-readable (such as, for example, the machine readable codes 26 described above with reference to FIG. 1), and are provided to a processor by extracting the identifier codes from the machine-readable format with a scanning machine (such as, for example, the scanning machine 30 described above with reference to FIG. 1). It is to be understood, however, that the invention encompasses other embodiments wherein the codes are printed in user-readable format, and read from the document by a user. The identifier codes can then be input to processor 32 by a user utilizing, for example, voice input or tactile input.

Another application of the present invention is described with reference to a flow chart of FIG. 3. At an initial step 200, a data set is provided on the Internet. The data set has an Internet address associated therewith (for purposes of interpreting this disclosure and the claims that follow, the term "internet address" includes any information that locates the data set on the internet, such as, for example, a URL). At a subsequent step 202, the Internet address is displayed on a substrate. The substrate can comprise, for example, paper, such as, for example, a portion of a newspaper or magazine. Alternatively, the substrate can comprise, for example, the display screen of a television, the display screen at a movie theater, or the display of a billboard. In applications in which a URL address is broadcast by radio or television, the substrate can comprise a piece of paper upon which a user has jotted the address.

At a next step 204, the address is provided to a machine configured to digitize the address, link to the address on the Internet, and download at least portion of the data set. The machine can comprise, for example, the scanning machine 30 described above with reference to FIG. 1. Further, the address can be provided in machine-readable code on the substrate, such that machine 30 digitizes the address by reading the machine-readable code. In other embodiments, the address can be printed on the substrate in a format readable by a user, and the machine which digitizes the address can be configured to digitize and recognize handwriting. In yet other embodiments, the user can provide the address to the machine by voicing the address. In particular embodiments, multiple URLs can be displayed on a substrate, a customer can mark the URL(s) that the customer is particularly interested in, and the machine can distinguish marked URL(s) from unmarked URL(s).

The methodology described with reference to FIG. 3 can have a number of applications for retrieving data from the Internet. For instance, the substrate can comprise a display describing merchandise, and the data set can comprise a more complete description of the merchandise than is provided by the display on the substrate. The material downloaded from the data set can then comprise the complete description of the merchandise that the user is particularly interested in.

In a particular embodiment, the substrate can comprise a listing of items which are described in the data set. The user can mark the items on the substrate, with the particular items which are marked being items about which the user desires more information. The machine which digitizes the Internet address can be configured to also distinguish marked items from items which are not marked, and to download portions of the data set which are associated with the marked items. Such portions can, for example, describe detailed information about the marked items. In a specific example, the substrate can comprise a display showing and describing clothing. The data set can comprise a more complete description of the clothing than the display, and can include software configured to show clothing described in the data set fitted to a model having input measurements. Accordingly, a user could input his/her measurements to the machine prior to downloading a portion of the data set, and could obtain a downloaded image showing specific clothing fitted to a model having measurements corresponding to those input by the user. The display of an outfit suited to a particular customer's measurements could cut down on product returns, as well as being fun for customers.

In another embodiment of the invention, the substrate could comprise a publication displaying a number of articles, and the data set could comprise a more complete description of the articles than the publication. The substrate could comprise, for example, a subscription card to a periodical. The card could comprise a listing of the articles, and be configured such that a user can mark items in a listing about which the user desired more information. The card could then be scanned by a scanning machine (such as, for example, scanner 30 of FIG. 1), and the machine could be configured to distinguish marked items from unmarked items, as well as to ascertain an Internet address of the data set where the description of the articles is contained. The machine could then be configured to download portions of the data set which describe the marked items.

In embodiments in which the substrate comprises a subscription card, the methodology of the present invention concept can be utilized to obtain a most current issue of a document identified by the subscription card from the internet by simply scanning the subscription card with a machine (such as the machine 30 of FIG. 1).

What is claimed is:

1. A method of storing and retrieving a document with different levels of document security provided for different portions of the document, comprising:

creating a data set corresponding to a document and storing the data set in a database, the document comprising a plurality of portions, the storing utilizing software configured to save a plurality of machine-readable identifier codes associated with the data set in the database; the identifier codes identifying the different portions of the document; the database being accessible to a plurality of users; some portions of the document being defined as secure portions and other portions being defined as non-secure portions; some users having authorization to access non-secure portions of the document and not having authorization to access secure portions of the document; the users being assigned access codes which identify if the users have clearance to access secure portions of the document;

printing the non-secure portions of the document together with at least some of the identifier codes on a substrate;

providing the identifier codes to a processor in data-communication with the database, the processor being configured to retrieve both the secure and the non-secure portions of the document and to send the retrieved portions of the document to an output device; the processor being further configured to recognize if an access code provides clearance to secure portions of the document:

requiring a user to input its individual access code to the processor before secure portions of the document are sent to the output device; and the processor sending secure portions of the document to the output device only if the inputted individual access code indicates that the user has clearance to obtain the secure portions.

2. The method of claim 1 wherein the user is required to input its individual access code before any portions of the document are sent to the output device.

3. The method of claim 1 wherein the user inputs the access code through keyboard or voice input.

4. The method of claim 1 wherein the access code comprises physical information about the user, and wherein the processor is in data communication with a sensor configured to sense the physical information.

5. The method of claim 1 wherein the identifier codes are printed on the non-secure portions of the document in machine-readable format, wherein the identifier codes are read from the substrate with a machine configured to extract the identifier codes from the machine-readable format, and wherein the identifier codes are provided from the machine to the processor.

6. The method of claim 1 wherein the identifier codes are printed on the non-secure portions of the document in user-readable format, wherein the identifier codes are read from the substrate by a user, and wherein the identifier codes are input to the processor by the user.

\* \* \* \* \*